US012731504B2

(12) United States Patent
Bray et al.

(10) Patent No.: US 12,731,504 B2
(45) Date of Patent: Sep. 8, 2026

(54) AUTO EXAM BUILDER

(71) Applicant: MasterControl Solutions, Inc., Salt Lake City, UT (US)

(72) Inventors: Matt Bray, South Jordan, UT (US); Stirling Waite, South Jordan, UT (US); Krishna Jha, Media, PA (US); Kendal Holcombe, Liberty Hill, TX (US); Joshua Dinerstein, Draper, UT (US); Alex Kaplunov, Menlo Park, CA (US); Viktoria Rojkova, Boulder Creek, CA (US); Staci Mihara, Salt Lake City, UT (US); Renee VonBergen, Salt Lake City, UT (US); Manoj Dobbali, Salt Lake City, UT (US); Denise Hale, Salt Lake City, UT (US)

(73) Assignee: MASTERCONTROL SOLUTIONS, INC., Salt Lake City, UT (US)

( * ) Notice: Subject to any disclaimer, the term of this patent is extended or adjusted under 35 U.S.C. 154(b) by 0 days.

(21) Appl. No.: 18/756,358

(22) Filed: Jun. 27, 2024

(65) Prior Publication Data

US 2025/0124805 A1 Apr. 17, 2025

Related U.S. Application Data

(60) Provisional application No. 63/543,846, filed on Oct. 12, 2023.

(51) Int. Cl.
*G09B 7/06* (2006.01)
*G06F 40/289* (2020.01)
(Continued)

(52) U.S. Cl.
CPC ............. *G09B 7/06* (2013.01); *G06F 40/289* (2020.01); *G06F 40/40* (2020.01); *G09B 7/02* (2013.01);
(Continued)

(58) Field of Classification Search
CPC .......... G09B 7/06; G09B 7/02; G09B 3/0482; G09B 3/0484; G09B 40/205; G06F 40/289; G06F 40/40
See application file for complete search history.

(56) References Cited

U.S. PATENT DOCUMENTS

| | | | | |
|---|---|---|---|---|
| 2005/0058978 | A1* | 3/2005 | Benevento, II | G09B 7/02 434/362 |
| 2008/0319955 | A1* | 12/2008 | Douglass | G06Q 30/02 |

(Continued)

OTHER PUBLICATIONS

"Multiple Choice Question Answering (MCQA)", Retrieved from https://paperswithcode.com/task/multiple-choice-qa/latest, Retrieved on Oct. 17, 2023, pp. 1-10.

*Primary Examiner* — Jack Yip
(74) *Attorney, Agent, or Firm* — Workman Nydegger

(57) ABSTRACT

A computer system for automatically building an exam displays an automated exam-building interface. The automated exam-building interface comprises a first portion of a user interface configured to display at least a portion of text data and a second portion of the user interface configured to display a question and a proposed answer based upon a selected subset of the text data. The computer system receives a selection of a first subset of the text data. The computer system creates a first task by combining the first subset of the text data with a first request and then provides the first task to a large language model. The computer system receives from the large language model a first question and a first proposed answer. The computer system displays the first question and the first proposed answer within the second portion of the user interface.

20 Claims, 8 Drawing Sheets

(51) Int. Cl.

| | |
|---|---|
| ***G06F 40/40*** | (2020.01) |
| ***G09B 7/02*** | (2006.01) |
| *G06F 3/0482* | (2013.01) |
| *G06F 3/0484* | (2022.01) |
| *G06F 40/205* | (2020.01) |

(52) U.S. Cl.

CPC .......... *G06F 3/0482* (2013.01); *G06F 3/0484* (2013.01); *G06F 40/205* (2020.01)

(56) References Cited

U.S. PATENT DOCUMENTS

| | | | | |
|---|---|---|---|---|
| 2009/0087827 | A1* | 4/2009 | Goldburd | G09B 7/06 434/362 |
| 2014/0335497 | A1* | 11/2014 | Gal | G09B 7/00 434/323 |
| 2015/0064685 | A1* | 3/2015 | Goldman | G09B 5/10 434/428 |
| 2015/0339213 | A1* | 11/2015 | Lee | G06F 3/04842 717/125 |
| 2018/0260472 | A1* | 9/2018 | Kelsey | G06F 40/56 |
| 2020/0364304 | A1* | 11/2020 | Kundu | G06F 40/253 |
| 2022/0180061 | A1* | 6/2022 | Kim | G06F 40/279 |
| 2022/0414332 | A1* | 12/2022 | Lee | G06F 40/284 |
| 2023/0080674 | A1* | 3/2023 | Attali | G06F 40/56 |
| 2024/0046392 | A1* | 2/2024 | Tudela | H04L 67/535 |
| 2024/0428079 | A1* | 12/2024 | Chen | G06N 3/08 |

* cited by examiner

AUTO EXAM BUILDER

CROSS-REFERENCE TO RELATED APPLICATIONS

This application claims the benefit of and priority to U.S. Provisional Patent Application Ser. No. 63/543,846 filed on 12 Oct. 2023 and entitled "AUTO EXAM BUILDER," which application is expressly incorporated herein by reference in its entirety.

BACKGROUND OF THE INVENTION

In order to remain compliant with federal regulation, regulated manufacturing companies, particularly in the life sciences, are required to document their procedures and prove that their employees have been specifically trained in each documented procedure. Each time a procedure changes, employees must be retrained in that procedure before they can work in the manufacturing process.

It is difficult to ensure that employee training has been effective and that a given employee understands the target material. In many cases, training departments are not well-staffed. In many fast-moving industries, Standard Operating Procedures (SOP) and Work Instructions are continually created and changed, and there is a high volume of related training. Because of the amount of training required and the volume of changes, companies are not able to regularly create tests or exams that check to ensure that employees have comprehended the training and understand the concepts. Today, exam and test creation is a manual process, requiring a subject matter expert to create questions and answers for each document that requires retraining.

Because of these constraints, many companies are left to simply have employees sign off that they read and understood a work instruction or standard operating procedure. This proves that training took place from a regulatory perspective but does not demonstrate that the employee understood or retained the training. This means that changes to SOP can introduce risk when employees are not fully aware of the previous SOP much less the changes.

Accordingly, there are a number of disadvantages in the art of exam builders.

BRIEF SUMMARY OF THE INVENTION

Embodiments of the present invention solve one or more problems in the art by providing an Automatic Exam Builder (AEB). In particular, embodiments of an AEB may provide regulated manufacturing companies with a higher level of assurance that their employees are well-trained by giving them the ability to quickly create exams that ensure employees have absorbed the training materials. Embodiments of an AEB may also allow Training Managers to select a document and a draft exam will be automatically generated, with sets of exam questions and answers.

Disclosed embodiments include systems and methods for automatically building an exam. An example system may comprise one or more processors and one or more computer-readable media having stored thereon executable instructions that when executed by the one or more processors configure the computer system to perform various acts. For instance, the computer system may display an automated exam-building interface. The automated exam-building interface may comprise a first portion of a user interface configured to display at least a portion of text data that has been parsed from a digital document and a second portion of the user interface configured to display a question and a proposed answer based upon a selected subset of the text data that is being displayed within the first portion of the user interface. The computer system may also identify a first chunk of the text data. The first chunk is identified by receiving a selection of a first subset of the text data displayed on the first portion of the user interface. Additionally, the system may create a first task by combining the first chunk with a first request. The system may then provide the first task to a large language model. After, the system receives from the large language model a first question and a first proposed answer based upon the first task. The system then displays the first question and the first proposed answer within the second portion of the user interface.

Additional features and advantages of exemplary embodiments of the invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims or may be learned by the practice of such exemplary embodiments as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the below-described figures.

DETAILED DESCRIPTION OF THE PREFERRED EMBODIMENTS

Disclosed embodiments relate to automated exam builders (AEBs). Disclosed embodiments may incorporate multiple different modules and functionalities to enable exams to be automatically built. Additionally, disclosed embodiments provide for a novel and innovative user interface that allows a user previously unattainable control and customization over the exam building process. In particular, disclosed embodiments allow users to individually pick the portions of material that should be tested. Additionally, disclosed embodiments may render visual indications that visually link a question to a particular portion of the source material from which the question was based.

In at least one embodiment, a user is able to guide the AEB software application in creating a proposed exam. One of skill in the art will appreciate that generative artificial intelligence programs often struggle with identifying important material within a large data set. Additionally, in the case of compliance training, it may be impossible to identify material that needs to be tested without fully understanding the role of a particular employee who is to be tested. In contrast to these conventional challenges, disclosed embodiments allow a user to guide the chunking of a parsed digital document and request questions be generated for specific subsets of the text within the document. This system provides a unique and technical improvement to shortfalls in the art relating to the guidance of generative artificial intelligence.

Figure 1:
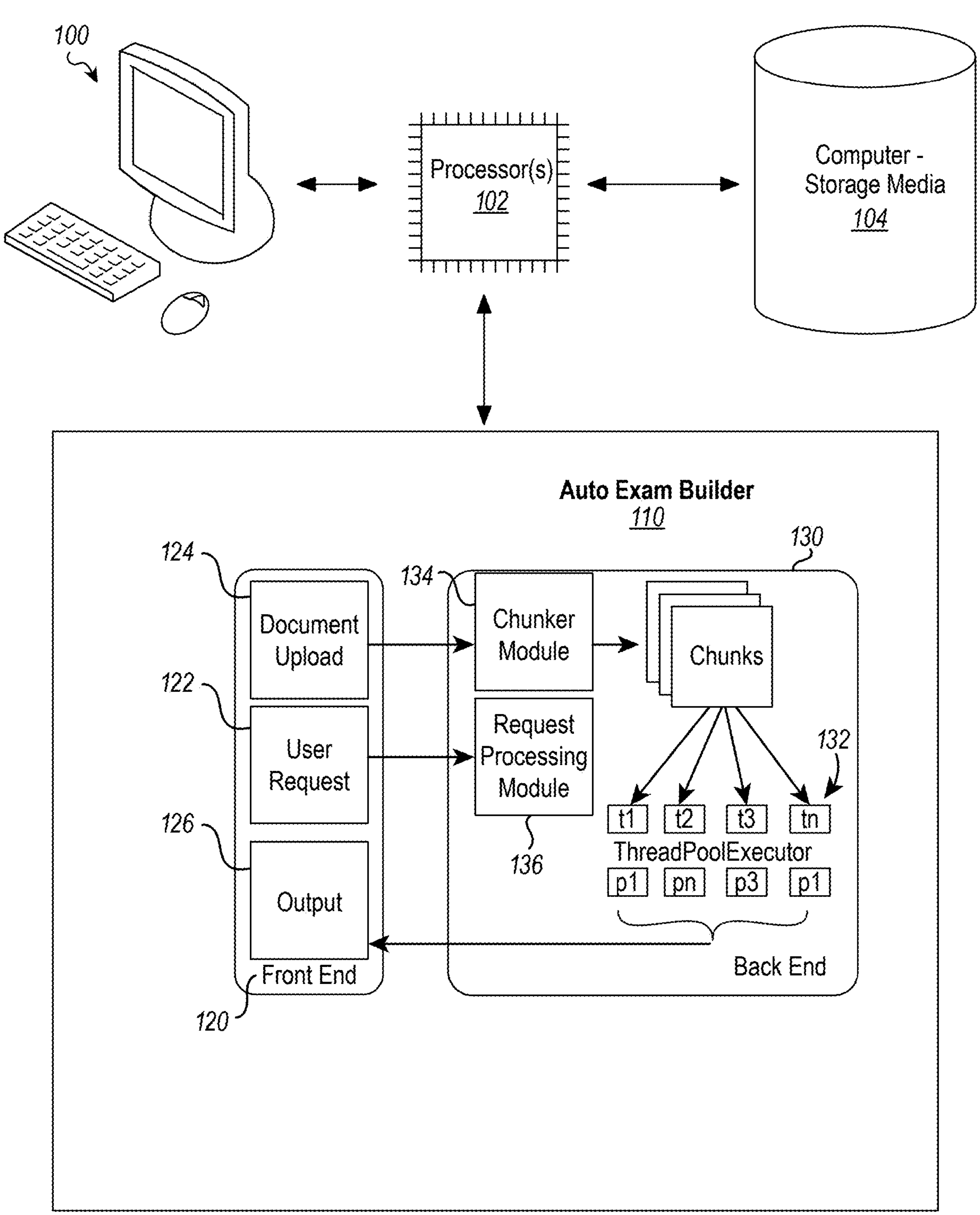
FIG. 1 illustrates a schematic of a computer system for an automated exam builder.

Turning now to the figures, FIG. 1 illustrates a schematic of a computer system 100 comprising one or more processors 102 and computer-storage media 104. Instructions within the computer-storage media 104 configure the one or more processors 102 to execute an automated exam builder (AEB) software application 110. According to FIG. 1, embodiments of an AEB 110 may include a front-end application 120. The front-end application 120 may exist as a standalone application in any format, including a 'jar' format. Additionally, the front-end application 120 may also exist as a User Interface on a website. Such an application may run as an executable on a local computer and be hosted on a local Uniform Resource Locator (URL). The local URL may include any port on the localhost, including port 8086. Such an application may also call Application Programming Interfaces (APIs) APIs to perform functions and tasks. The APIs may comprise an AEB Service and may contain functions and tasks relevant to building an exam.

Embodiments of the front-end application 120 may include a user request 122 (also referred to herein as "the request"), which may be part of the front-end application 120. The user request 122 may indicate a specified number of questions for the AEB 110 to generate or a type of questions to generate. For example, the user request 122 may indicate that the user desires ten multiple-choice questions and three open-ended questions. The user request 122 may, at least in part, cause a generative facility 130 to build an exam with the specified number of questions and/or of the specific type.

Embodiments of the front-end application 120 may also include a document upload 124. The document upload 124 may comprise multiple ways to import or upload a document. For example, the document upload 124 may include pre-loaded standard operating procedures (SOP). The pre-loaded SOPs may comprise different manuals that contain SOPs for different business practices. The SOPs may be presented in a viewable form. For example, the text of the SOPs may be displayed on a screen as part of the front-end application 120. Additionally or alternatively, the document upload 124 may allow a user to upload the user's own documents to the AEB 110. Such documents may be of any format, including PDF, text, and PNG.

Embodiments of the front-end application 120 may include an output 126. A user may export built exams as part of the output 126. The user may export built exams to any destination, including the local computer, an email, or a network location. The user may export the built exams in any suitable format, including PDF, TXT, and DOCX.

As mentioned above, at least one embodiment of an AEB 110 includes a generative facility 130. Upon receiving the user request 122, the generative facility 130 may build an exam that contains the requested number of questions. The generative facility 130 may use a provided document from the document upload 124 to build an exam that contains the requested number of questions. For example, the generative facility 130 may use a pre-loaded SOP manual to build an exam that contains the requested number of questions. Additionally or alternatively, the generative facility 130 may use a document from the document upload 124 that was provided by a user to build an exam that contains a specified number of questions.

After building an exam, embodiments of the front-end application 120 may then return an output 126 containing at least the built exam. The built exam may include multiple choice questions, short answer questions, or any other kind of questions. Embodiments of an AEB 110 may also, as part of the output 126, return the correct answer or answers for each question in the built exam. Embodiments of the generative facility 130 may display the built exam and the correct answer for each question to a user. Embodiments of an AEB 110 may include functionality to cycle a display between generated questions. For example, embodiments of an AEB 110 may display one out of four generated questions on a screen. A user may then click a button on the screen to proceed to the second of four generated questions, and so on, until the user views all of the generated questions.

Embodiments of an AEB 110 may also display a document that the generative facility 130 used to build the exam. Displaying the document may beneficially allow end users to assess the quality of the built exam in light of the document. In this way, the user may provide feedback to the AEB 110 that the generated exam is unsatisfactory or otherwise undesirable. This may allow for an improvement in successively generated exams. As an illustrative example, if the generative facility 130 used a SOP manual for conducting a business transaction (assume that such an SOP manual includes principle factors to consider when conducting a business transaction) and generated an exam containing a single question that reads 'what are the principle factors to consider when conducting a business transaction?', then a user may assess that the generated question is of a high quality, as it is both accurate and pertinent to the SOP document.

Additionally, embodiments of an AEB 110 may allow a user to rebuild an exam with a specified number of questions. For example, a user may rebuild an exam with a specified number of questions when the user assesses that the quality of the built exam is low. Rebuilt exam questions may be seemingly and/or noticeably different than questions of previously built exams, which may allow for an increased assessment of quality and satisfaction. This may be because of the generative facility 130 used by embodiments of the AEB to generate the questions.

Special attention will now be paid to the generative facility 130 of FIG. 1. The generative facility 130 may include four modules: a large language model (LLM) module 132, a chunker module 134, and a request processing module 136.

The LLM module 132 may comprise any suitable LLM including a standalone OpenAI ChatGPT 3.5. The LLM module may run on a series of cloud Graphics Processing Units (GPUs). For example, the module may run on a series of 20 different AWS gpu instances. The LLM module 132 may also include functionality to parallelize incoming tasks in order to enable parallel processing of those incoming tasks. As an example, the LLM module 132 may include a 'ThreadPooling Executor' for parallel processing.

In at least one embodiment, the chunker module 134 may identify markups in a provided document (such as a document from the document upload 124) in order to identify features of the document that indicate a specific structure. For example, the chunker module 134 may identify whether a structure is an empty paragraph, a body paragraph, a title paragraph, or an informational paragraph in the document. The chunker module 134 may use multiple different features in order to identify a structure within the document.

The chunker module 134 may also identify features within identified structures in order to define a tile. A tile may be the smallest granular interpretation made by the chunker module 134 in identifying structures within a document. Multiple tiles may be stacked on top of and/or within one another, may be consecutive one to another, and may overlap one with another. A user may be able to designate a given tiling regime based on different parameters, which may be called 'chunker parameterization'. At least one benefit of chunker parameterization includes guard railing the input that is sent to the LLM module 132. Guard railing the input that is sent to the LLM module 132 may beneficially decrease the context for potential hallucinations, guarantee document coverage, and increase the efficiency of the use of an inference machine.

The chunker module 134 may produce a set of chunks. Each chunk within the set of chunks may then be combined with a prompt from the user request 122 and become a task. In this way, a set of tasks may be generated from the combination of each chunk within the set of chunks and a prompt from the user request 122. The set of tasks may then be given to a different module or process for parallelized processing. For example, the set of tasks may be given to an LLM module 132, and the LLM module 132 may then parallelize each task within the set of tasks and process them according to that parallelization. Such parallel processing may result in an output 126 being created. For example, each task within the set of tasks may individually generate a single question with multiple-choice answers and one correct answer that is obtained in a concurrent fashion. Each generated question with multiple choice answers and correct answers may be combined together into the output 126 as part of the automatically generated exam. The chunker module 134 thus may aid embodiments of an AEB in automatically building exams in a computationally efficient way.

The request processing module 136 may be used to handle a user request 122 sent from the front-end application 120. For example, the request processing module 136 may standardize how the request information is provided to the generative facility 130 such that the request for specific numbers of questions and/or specific types of questions is always consistently presented to the generative facility 130 to avoid inconsistent results based upon the formatting of the user request.

In an additional or alternative embodiment of an AEB 110, a user may provide feedback regarding the effectiveness of the generated exam upon administration. Such feedback may include metrics such as the pass rate of individuals who were administered the exam, the performance of individuals on individual questions, and the compliance rate of the company before and after administering the exam. The feedback may be used to further improve the AEB and the exams that it generates.

Figure 2:
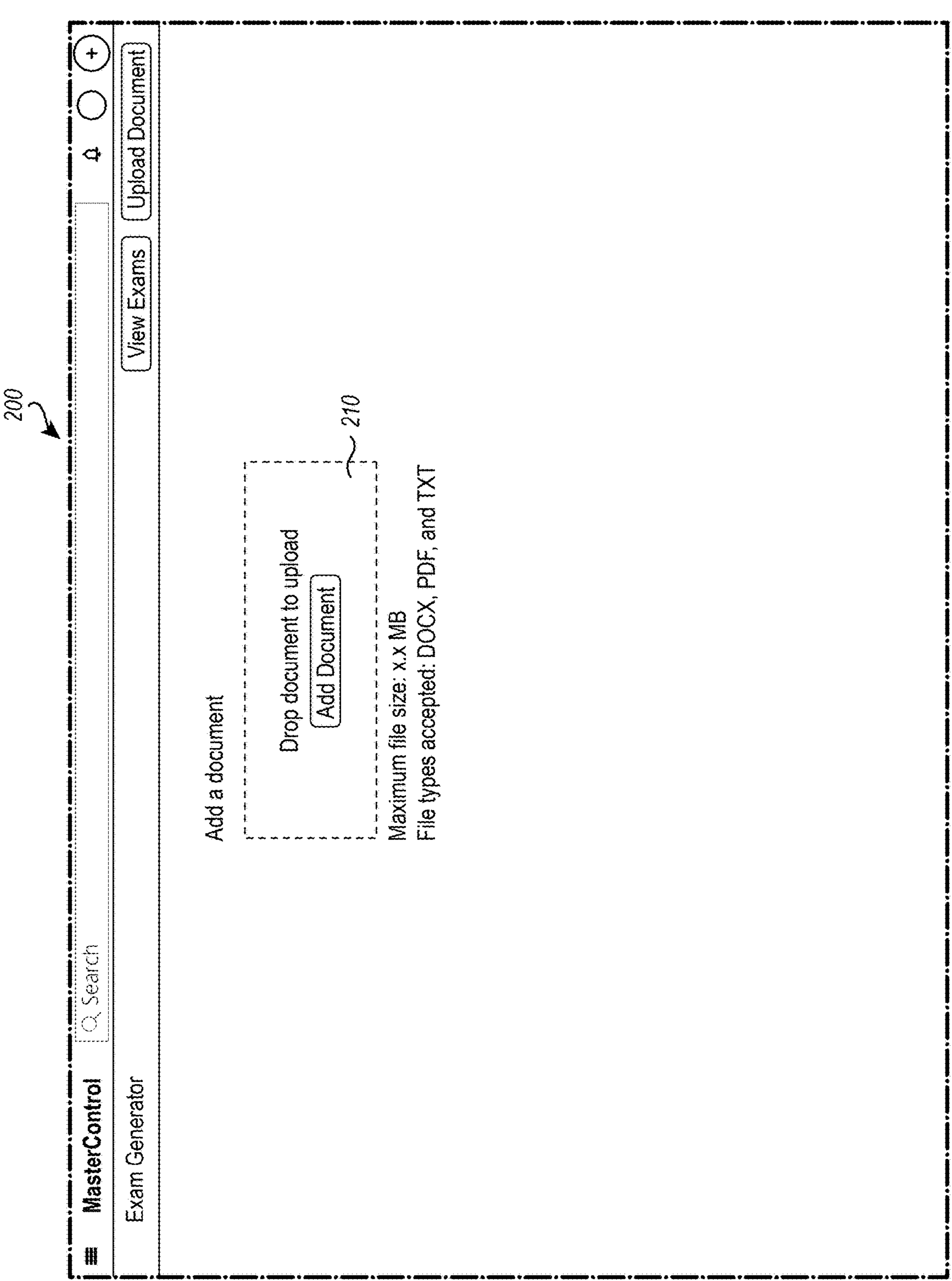
FIG. 2 illustrates a user interface for an automated exam builder software application.

FIGS. 2-7 depict various automated exam-building interfaces 200 for interacting with the AEB 110. For example, FIG. 2 depicts a user interface 200 with an upload object 210. Upload object 210 may be in communication with document upload 124. Using the upload object 210, a user may be able to upload any number of different digital documents. The uploaded digital documents may comprise parsed text and/or images of text. In at least one embodiment, the document upload 124 may be configured to perform optical character recognition (OCR) on documents that are uploaded through the upload object 210.

Figure 3:
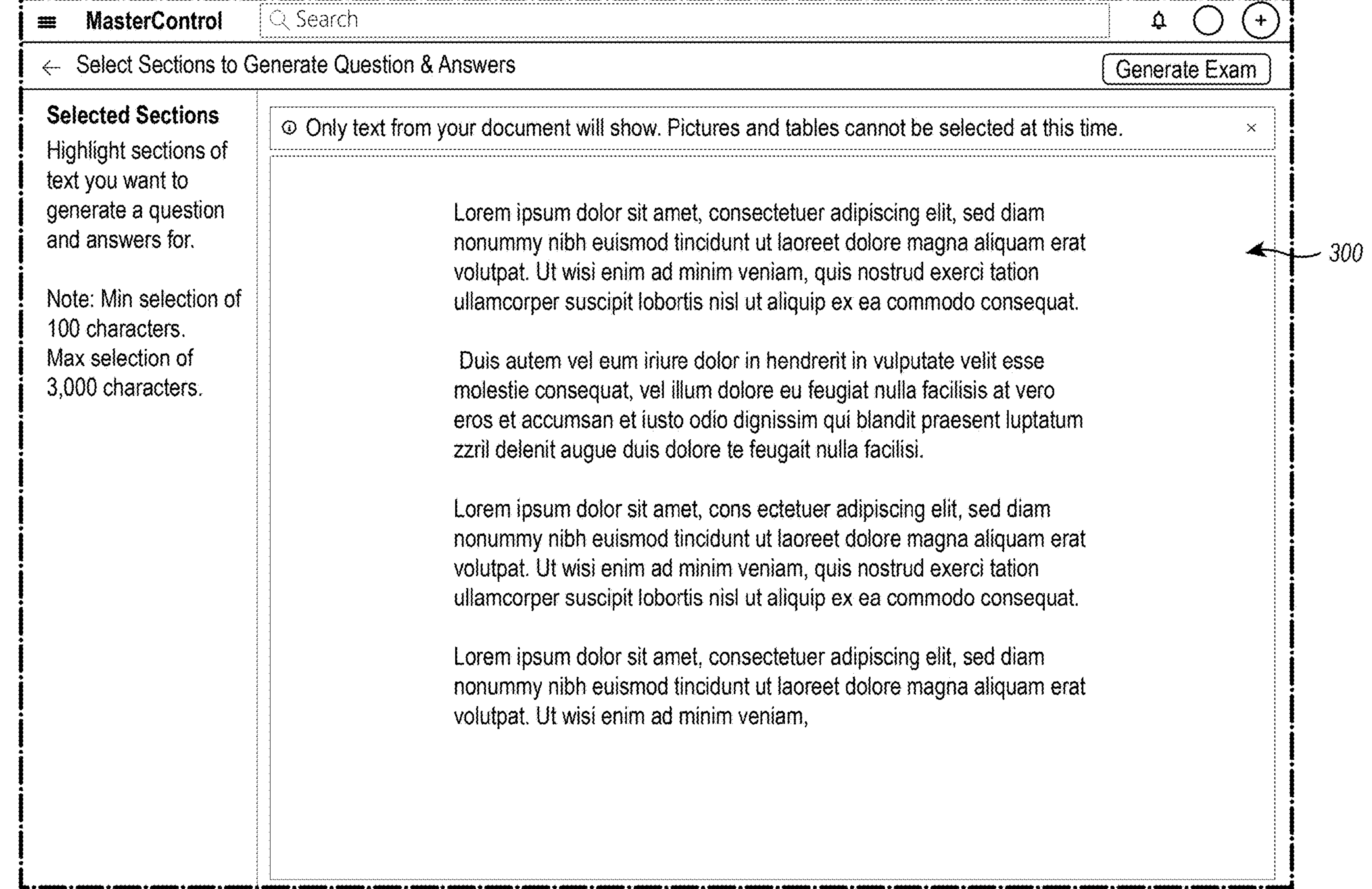
FIG. 3 illustrates a user interface for an automated exam builder software application.

As depicted in the automated exam-building interface 200 of FIG. 3, once a document is uploaded, the text data 300 within the document may be displayed. In at least one embodiment, a user is able to review the text data 300 to verify that it appears correct. For example, in the case that an uploaded document was an image of text and had to go through an OCR process, the user can review the text data 300 displayed on the automated exam-building interface 200 and verify that the OCR process accurately identified the text and words within the document.

Figure 4:
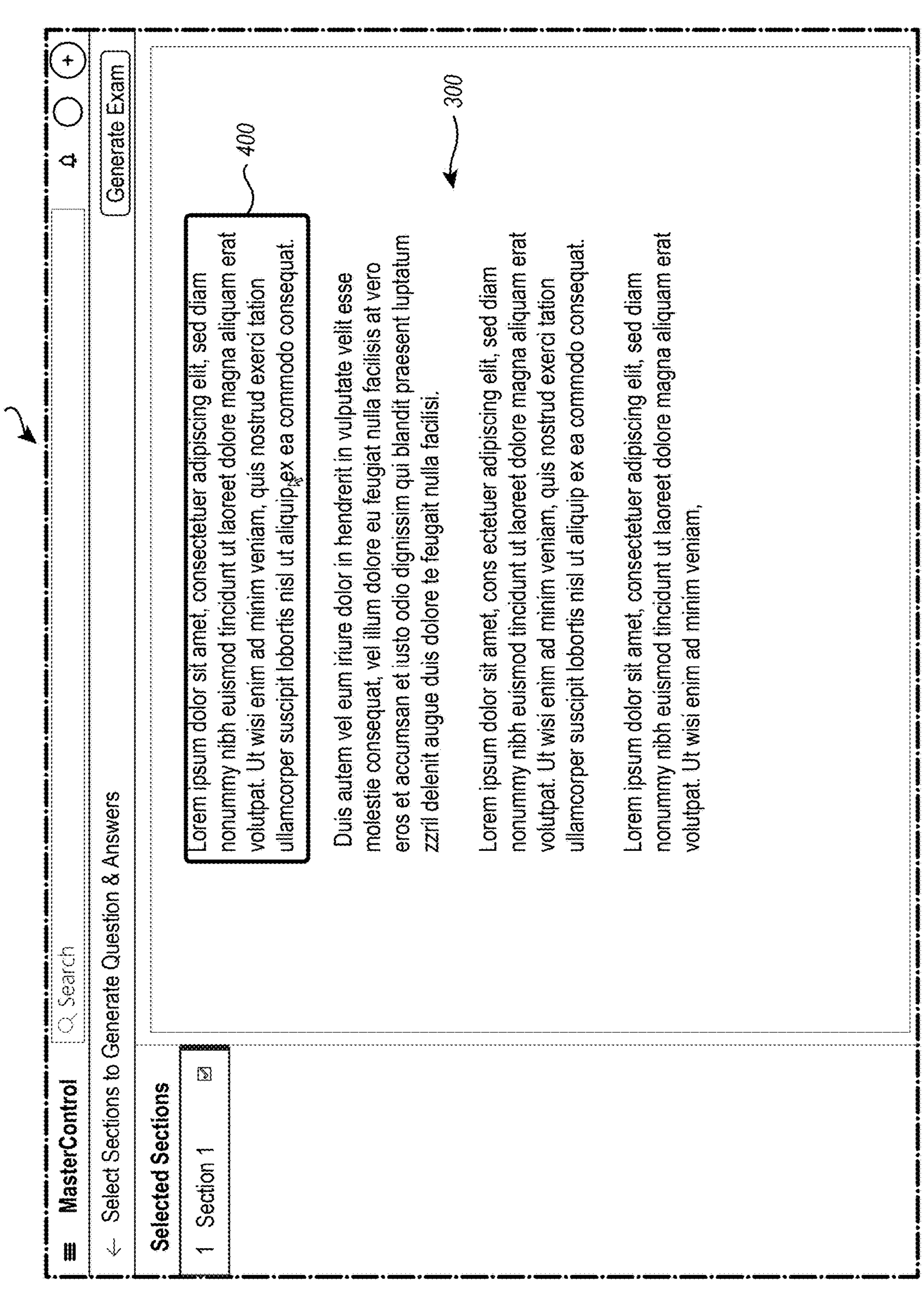
FIG. 4 illustrates a user interface for an automated exam builder software application.

FIG. 4 depicts a user selection of a first subset 400 of the text data 300. In at least one embodiment, the user selects the first subset 400 of text data 300 by clicking and dragging a mouse over the text of interest. Additionally or alternatively, the user may click on a sentence or paragraph and the automated exam-building interface 200 may automatically highlight or otherwise visually indicate the first subset 400 of text 300 has been selected.

Figure 5:
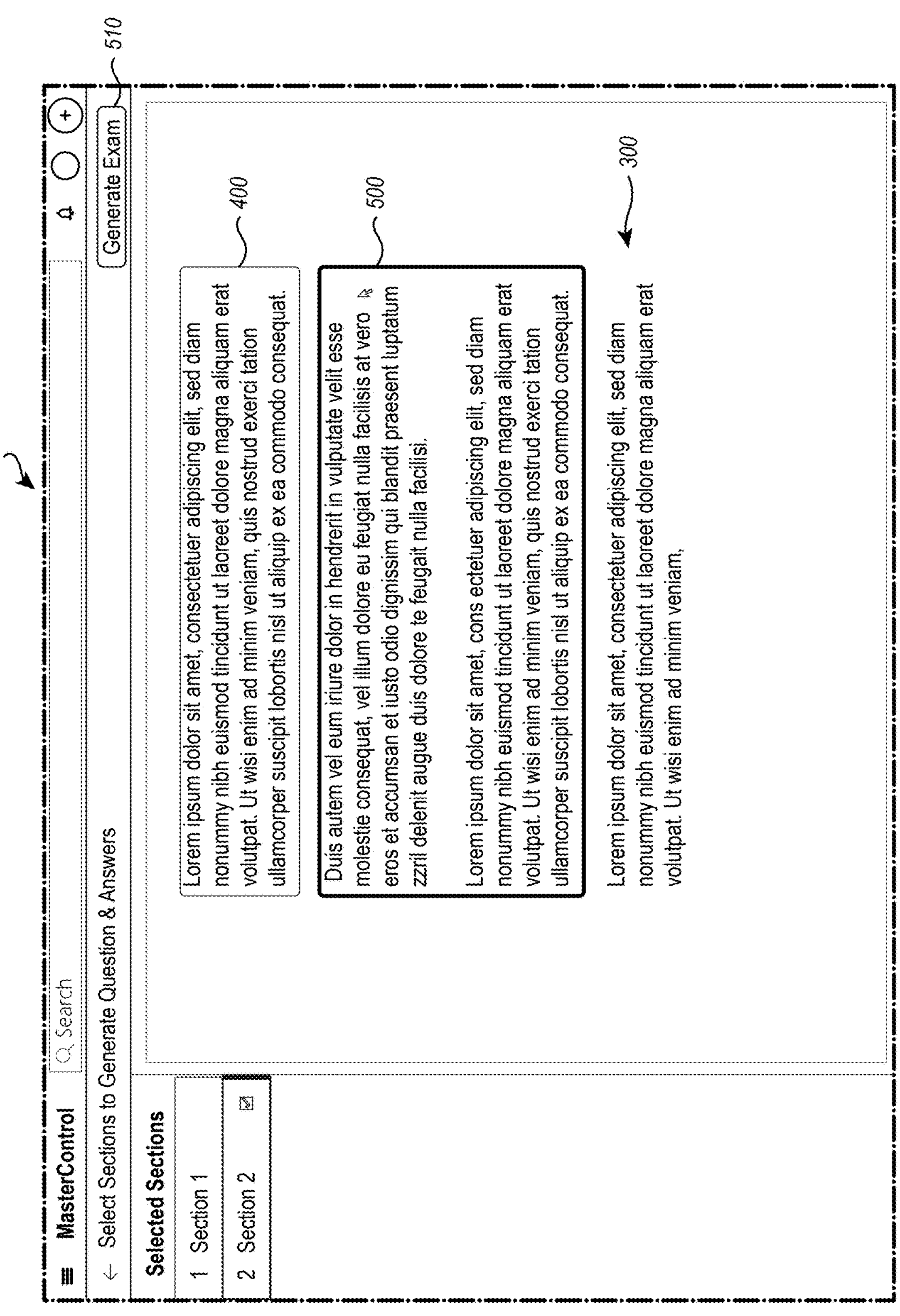
FIG. 5 illustrates a user interface for an automated exam builder software application.

Similarly, FIG. 5 a second subset 500 of text data 300 that has been selected by a user. As depicted, the second subset 500 of text data 300 may be visually depicted separately from the first subset 400 of text data 300. As such, a user is quickly and easily able to visually distinguish between different subsets 400, 500 of text data 300 that the user has selected.

Figure 6:
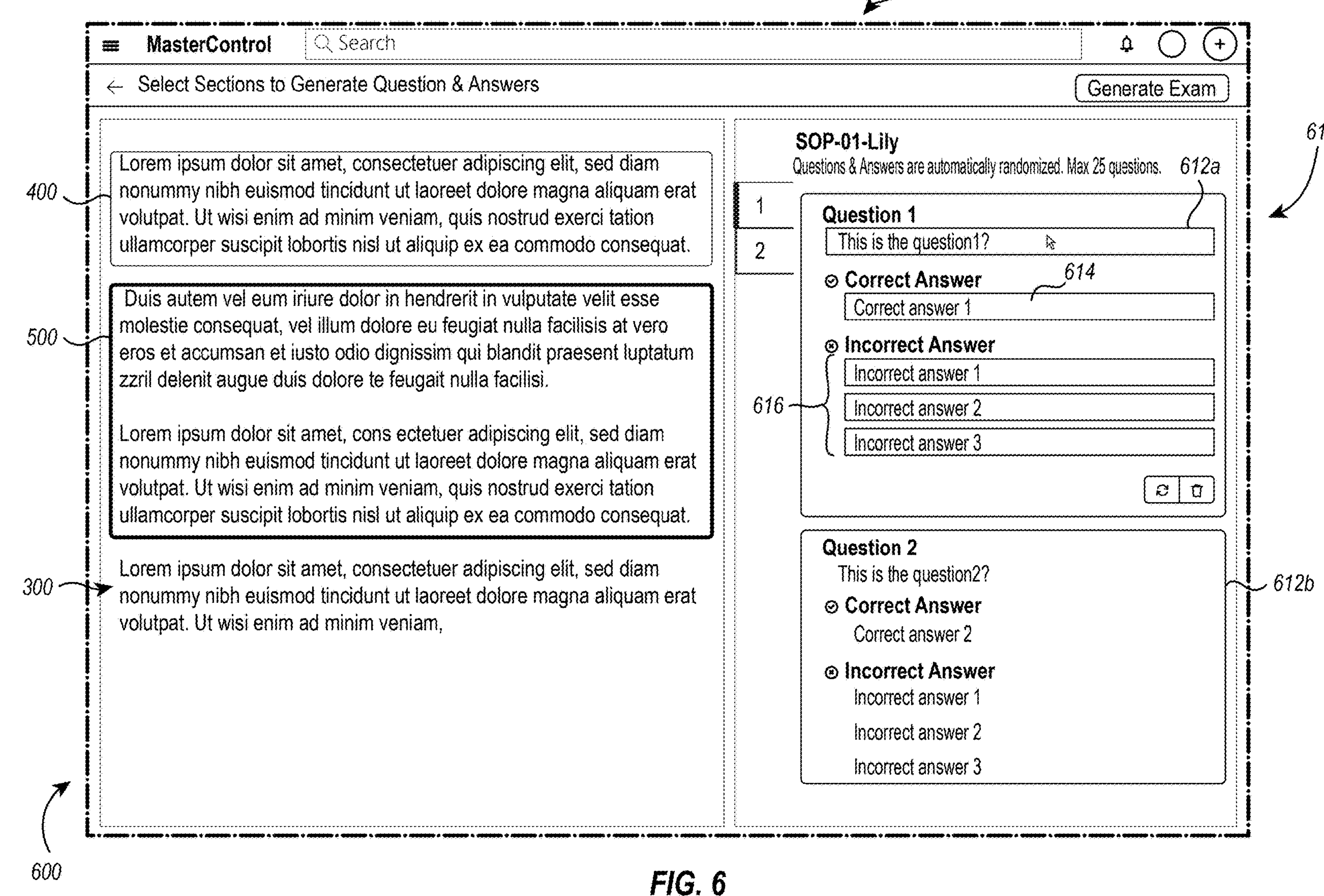
FIG. 6 illustrates a user interface for an automated exam builder software application.

FIG. 6 illustrates an automated exam-building interface 200 that comprises a first portion 600 and a second portion 610. The first portion 600 of the automated exam-building interface 200 is configured to display at least a portion of text data 300 that has been parsed from a digital document. The second portion 610 is configured to display a question 612*a* and a proposed answer 614 based upon the selected first subset 400 of the text data 300 that is being displayed within the first portion 600 of the automated exam-building interface 200. In at least one embodiment, the AEB 110 can receive a user selection of the first question 612*a* within the second portion of the automated exam-building interface 200 and render a visual indication indicating the first subset 400 of the text data 300 within the first portion 600 of the user interface. For example, selecting the first question 612*a* may cause the first subset 400 of the text data 300 to be highlighted within the first portion 600 of the user interface. Additionally, in at least one embodiment, selecting the first question 612*a* may cause the first portion 600 of the user interface to automatically scroll to the location of the first subset 400 of the text data 300 within the first portion 600 of the user interface. As such, a user can quickly and efficiently determine the relationship between each question (e.g., 612*a*) and each subset of text (e.g., 400).

In at least one embodiment, the first portion 600 of automated exam-building interface 200 is rendered in a column adjacent to the second portion 610 of the automated exam-building interface 200. In additional or alternative embodiments, the first portion 600 and the second portion 610 of the automated exam-building interface 200 may be rendered as stacked in a row format. Further, in at least one embodiment, the second portion 610 of the automated exam-building interface 200 may comprise a collection of comment or note bubbles rendered over each respective subset of the text data 300 that was used to create each respective question 612*a*. As such, the second portion 610 may not comprise a continuous single portion of the automated exam-building interface 200 but may instead comprise a collection of discrete portions of the automated exam-building interface 200.

In at least one embodiment, after uploading a digital document, the chunker module 134 identifies a first chunk of the text data. In this example embodiment, the first chunk is identified by receiving a selection of a first subset 400 of the text data 300 displayed on the first portion 600 of the automated exam-building interface 200. Accordingly, in at least one embodiment, the chunker module 134 does not automatically identify chunks, but instead, the chunker module 134 operates based upon subsets of text data that are manually selected by a user.

Once the first subset 400 of text data 300 has been provided to the chunker 134, the request processing module 136 can create a first task by combining the first chunk (i.e., the first subset 400 of the text data 300) with a first request. The first request may be caused by clicking on the Generate Exam button 510 shown in FIG. 5. In at least one embodiment, the request processing module 136 creates requests based upon the number of subsets 400, 500 of text data 300 that have been selected by a user. In at least one additional or alternative embodiment, the request processing module 136 also receives user-provided parameters to include within the first request. For example, a user may indicate the type of question desired (e.g., multiple choice, open-ended, true or false, fill-in-the-blank, etc.), the difficulty of the question desired (beginner, intermediate, advanced, etc.), and/or various other question parameters that define the type of questions and answered desired.

The generative facility 130 can then provide the first task to an LLM module 132. The output 126 can then receive from the LLM module 132 a first question 612*a* and a first proposed answer 614 based upon the first task. In some cases, the first proposed answer 612*a* comprises multiple choice answers and the multiple-choice answers include a proposed correct answer 614 and multiple proposed incorrect answers 616. The output 126 displays the first question 612*a* and the first proposed answer 614 within the second portion of the automated exam-building interface 200.

In at least one embodiment, the second portion 610 of the automated exam-building interface 200 may display one or more editable fields for the first question 612*a* and the first proposed answer 614 within the second portion 610 of the user interface. In at least one embodiment, the first question 612*a* and the first proposed answer 614 are both rendered in an editable form. The AEB 110 may receive user input revising the first question 612*a* and/or the first proposed answer 614. For example, the first question 612*a* and/or the first proposed answer 614 may be incorrect, may comprise a grammar error, or may lack clarity. Similarly, in at least one embodiment, the AEB 110 may receive user input revising an incorrect answer selected from the multiple proposed incorrect answers 616. For example, one of the proposed incorrect answers may in fact be correct or otherwise ambiguous. Allowing the user to revise questions and answers can lead to higher quality questions, and in some embodiments, the AEB 110 can train the LLM 132 using the revised first question 612*a* and/or the revised first proposed answers 614, 616 and the first subset 400 of the text data 300.

Additionally, as shown in FIG. 6, a user may be able to select multiple subsets 400, 500 of text data 300 and generate multiple questions 612*a*, 612*b* based upon those selections. For example, the chunker module 134 identifies a second chunk of the text data 300. The second chunk is identified by receiving a selection of a second subset 500 of the text data 300 displayed on the first portion 600 the user interface. The request processing module 136 creates a second task by combining the second chunk with a second request. In at least one embodiment, the second request and the first request are the same request. Alternatively, in at least one embodiment, the second request is different from the first request. For example, the first request may request a multiple-choice question while the second request may request an open-ended question. In at least one embodiment, a single request is able to request multiple different questions and multiple different types.

The generative facility 130 can provide the second task to an LLM module 132. The output 126 can then receive from the LLM module 132 a second question 612*b* and a second proposed answer based upon the second task. The output 126 displays the first question 612*b* and the first proposed answer within the second portion of the automated exam-building interface 200.

Figure 7:
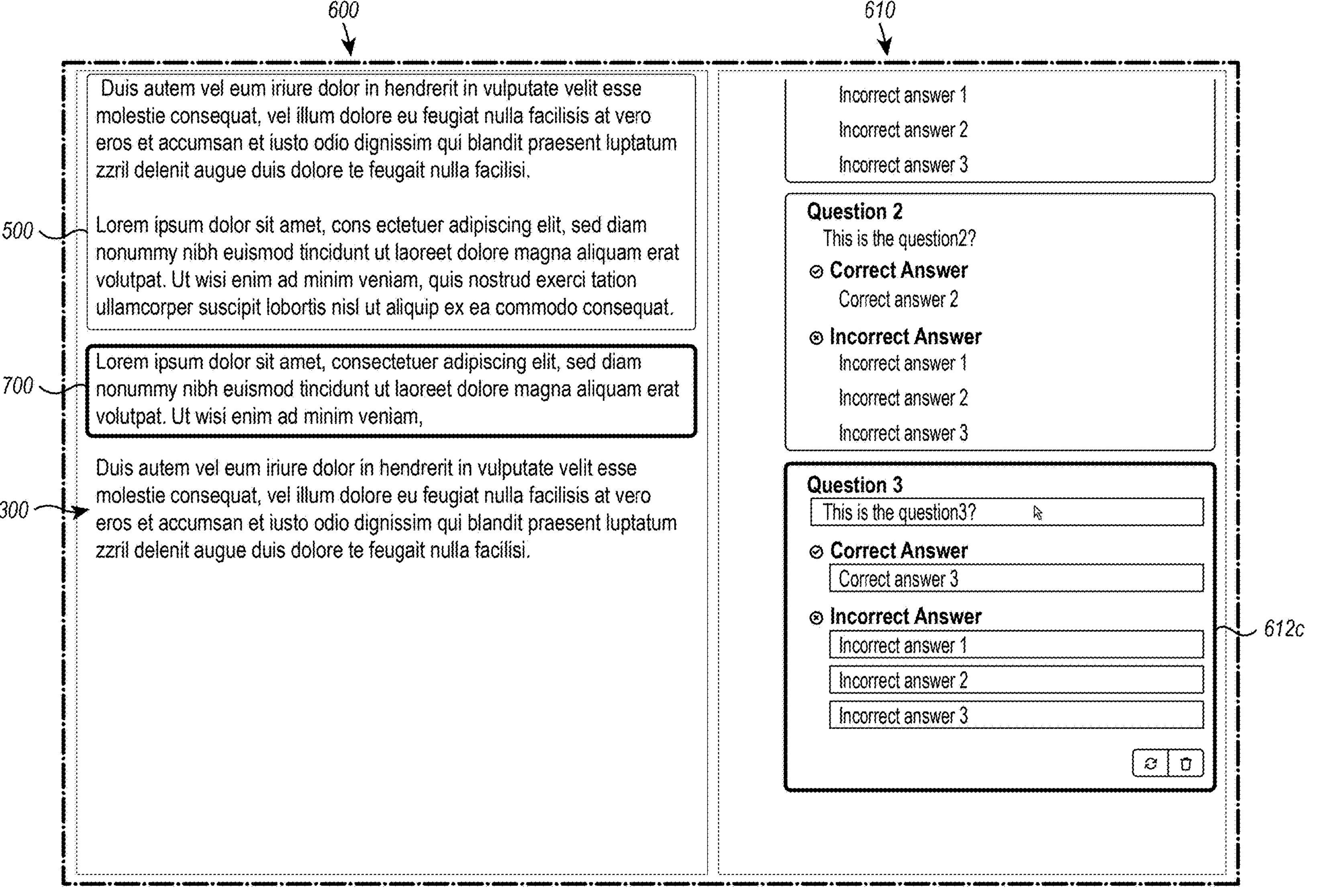
FIG. 7 illustrates a user interface for an automated exam builder software application.

FIG. 7 illustrates a continuation of the user interface of FIG. 6. In particular, in FIG. 7 a user has scrolled further down in the text data 300 displayed in the first portion 600 of the user interface. The user has then selected a third subset 700 of text data 300 and in response the AEB 110 generated a third question 612*c*. Accordingly, even after initial questions 612*a*, 612*b* have been generated, a user can continue to add additional questions 612*c* by selecting additional subsets of text. In at least one embodiment, a user can select overlapping subsets of text. When generating questions based upon the overlapping subsets of text, the generative facility 130 may weight the questions to primarily rely upon material that is not overlapped, while still using the overlapping material as context to the question. Such a system may avoid creating the same question for two different, overlapping subsets of text.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 8:
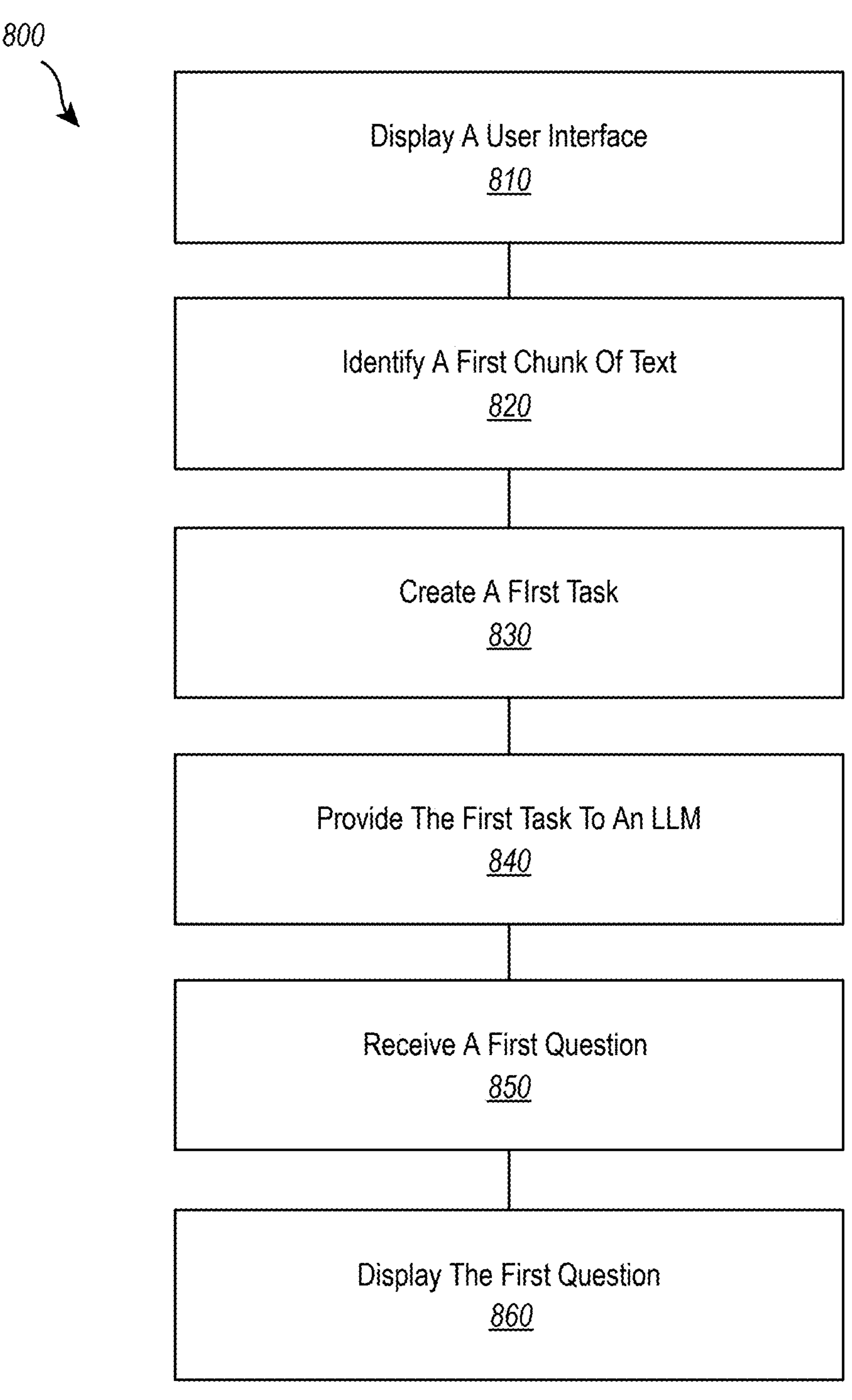
FIG. 8 illustrates a flowchart for a method of automated exam building.

FIG. 8 illustrates a flow chart for a method 800 of automated exam building. The method 800 comprises an act 810 of displaying a user interface. Act 810 includes displaying an automated exam-building interface 200. The automated exam-building interface 200 comprises a first portion 600 of a user interface configure to display at least a portion of text data 300 that has been parsed from a digital document and a second portion 610 of the user interface configured to display a question 612*a* and a proposed answer 614 based upon a selected subset (e.g., the first subset 400) of the text data 300 that is being displayed within the first portion 600 of the user interface.

Method 800 also comprises an act 820 of identifying a first chunk of text. Act 820 includes identifying a first chunk of the text data 300. The first chunk is identified by receiving a selection of a first subset 400 of the text data 300 displayed on the first portion 600 the user interface. Additionally, method 800 comprises an act 830 of creating a first task. Act 830 includes creating a first task by combining the first chunk with a first request. Act 840 then comprises providing the first task to an LLM 132.

Further, method 800 comprises act 850 of receiving a first question. Act 850 includes receiving from the LLM 132 a first question 612*a* and a first proposed answer 614 based upon the first task. Act 860 then includes displaying the first question 612*a* and the first proposed answer 614 within the second portion 610 of the user interface.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Computing system functionality can be enhanced by a computing systems' ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud and remote based service applications are prevalent. Such applications are hosted on public and private remote systems such as clouds and usually offer a set of web-based services for communicating back and forth with clients.

Many computers are intended to be used by direct user interaction with the computer. As such, computers have input hardware and software user interfaces to facilitate user interaction. For example, a modern general-purpose computer may include a keyboard, mouse, touchpad, camera, etc. for allowing a user to input data into the computer. In addition, various software user interfaces may be available.

Examples of software user interfaces include graphical user interfaces, text command line-based user interface, function key or hot key user interfaces, and the like.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system for automatically building an exam, the computer system comprising:

one or more processors; and one or more computer-readable media having stored thereon executable instructions that when executed by the one or more processors configure the computer system to perform at least the following:

display an automated exam-building interface, the automated exam-building interface displaying both:

a first portion of a user interface configured to display at least a portion of text data that has been parsed from a digital document, wherein the first portion comprises a first column of information displayed within the automated exam-building interface, and a second portion of the user interface configured to display a question and a proposed answer based upon a selected chunk of the text data that is being displayed within the first portion of the user interface, wherein the second portion comprises a second column of information displayed within the automated exam-building interface;

receive a user input selecting a first chunk of the text data from the first portion of the user interface, wherein the user input comprises an explicit manual selection of the first chunk from the displayed text data;

generate a first task by combining the first chunk with a first request, wherein the first chunk was selected via a user input selecting the first chunk of the text data from the first portion of the user interface;

provide the first task to a large language model;

receive from the large language model a first question and a first proposed answer based upon the first task;

display the first question and the first proposed answer within the second portion of the user interface; and generate a visual linkage between the selected first chunk in the first portion and the displayed first question in the second portion, wherein the visual linkage between the selected first chunk in the first portion and the displayed first question in the second portion comprises (i) highlighting the selected first chunk within the first portion of the user interface, and (ii) automatically scrolling the first portion of the user interface to the selected first chunk in response to a user selection of the displayed first question.

2. The computer system of claim 1, wherein the first portion of a user interface is rendered in a column adjacent to the second portion of the user interface.

3. The computer system of claim 2, wherein the executable instructions include instructions that are executable to configure the computer system to:

receive a user selection of the first question within the second portion of the user interface; and render a visual indication indicating the first chunk of the text data within the first portion of the user interface.

4. The computer system of claim 1, wherein the executable instructions include instructions that are executable to configure the computer system to:

display one or more editable fields for the first question and the first proposed answer within the second portion of the user interface;

receive user input revising the first question and/or the first proposed answer; and train the large language model using the revised first question and/or the revised first proposed answer and the first chunk of the text data.

5. The computer system of claim 4, wherein the first proposed answer comprises multiple-choice answers, the multiple-choice answers comprising a proposed correct answer and multiple proposed incorrect answers.

6. The computer system of claim 5, wherein the executable instructions include instructions that are executable to configure the computer system to:

receive user input revising an incorrect answer selected from the multiple proposed incorrect answers; and train the large language model using the revised incorrect answer and the first chunk of the text data.

7. The computer system of claim 1, wherein the executable instructions include instructions that are executable to configure the computer system to:

identify a second chunk of the text data, wherein the second chunk is identified by receiving a selection of a second chunk of the text data displayed on the first portion the user interface;

create a second task by combining the second chunk with a second request;

generate, using the large language model, a second question and a second proposed answer based upon the second task; and display the second question and the second proposed answer within the second portion of the user interface.

8. The computer system of claim 7, wherein the first chunk of the text data and the second chunk of the text data at least partially overlap.

9. The computer system of claim 7, wherein the first question is a multiple-choice question and the second question is an open-ended question.

10. A computer-implemented method for automatically building an exam, the computer-implemented method comprising:

displaying an automated exam-building interface, the automated exam-building interface displaying both:

a first portion of a user interface configured to display at least a portion of text data that has been parsed from a digital document, wherein the first portion comprises a first column of information displayed within the automated exam-building interface, and a second portion of the user interface configured to display a question and a proposed answer based upon a selected chunk of the text data that is being displayed within the first portion of the user interface, wherein the second portion comprises a second column of information displayed within the automated exam-building interface;

receiving a user input selecting a first chunk of the text data from the first portion of the user interface, wherein the user input comprises an explicit manual selection of the first chunk from the displayed text data;

generating a first task by combining the first chunk with a first request, wherein the first chunk was selected via a user input selecting the first chunk of the text data from the first portion of the user interface;

providing the first task to a large language model;

receiving from the large language model a first question and a first proposed answer based upon the first task;

displaying the first question and the first proposed answer within the second portion of the user interface; and generating a visual linkage between the selected first chunk in the first portion and the displayed first question in the second portion, wherein the visual linkage between the selected first chunk in the first portion and the displayed first question in the second portion comprises (i) highlighting the selected first chunk within the first portion of the user interface, and (ii) automatically scrolling the first portion of the user interface to the selected first chunk in response to a user selection of the displayed first question.

11. The computer-implemented method of claim 10, wherein the first portion of a user interface is rendered in a column adjacent to the second portion of the user interface.

12. The computer-implemented method of claim 11, further comprising:

receiving a user selection of the first question within the second portion of the user interface; and rendering a visual indication indicating the first chunk of the text data within the first portion of the user interface.

13. The computer-implemented method of claim 10, further comprising:

displaying one or more editable fields for the first question and the first proposed answer within the second portion of the user interface;

receiving user input revising the first question and/or the first proposed answer; and training the large language model using the revised first question and/or the revised first proposed answer and the first chunk of the text data.

14. The computer-implemented method of claim 13, wherein the first proposed answer comprises multiple-choice answers, the multiple-choice answers comprising a proposed correct answer and multiple proposed incorrect answers.

15. The computer-implemented method of claim 14, further comprising:

receiving user input revising an incorrect answer selected from the multiple proposed incorrect answers; and training the large language model using the revised incorrect answer and the first chunk of the text data.

16. The computer-implemented method of claim 10, further comprising:

identifying a second chunk of the text data, wherein the second chunk is identified by receiving a selection of a second chunk of the text data displayed on the first portion the user interface;

creating a second task by combining the second chunk with a second request;

generating, using the large language model, a second question and a second proposed answer based upon the second task; and displaying the second question and the second proposed answer within the second portion of the user interface.

17. The computer-implemented method of claim 16, wherein the first chunk of the text data and the second chunk of the text data at least partially overlap.

18. The computer-implemented method of claim 17, wherein first second question is a multiple-choice question and the second question is an open-ended question.

19. A computer-readable media comprising one or more physical non-transitory computer-readable storage media having stored thereon computer-executable instructions that, when executed at a processor, cause a computer system to perform a method for automatically building an exam, the method comprising:

displaying an automated exam-building interface, the automated exam-building interface displaying both:

a first portion of a user interface configured to display at least a portion of text data that has been parsed from a digital document, wherein the first portion comprises a first column of information displayed within the automated exam-building interface, and a second portion of the user interface configured to display a question and a proposed answer based upon a selected chunk of the text data that is being displayed within the first portion of the user interface, wherein the second portion comprises a second column of information displayed within the automated exam-building interface;

receiving a user input selecting a first chunk of the text data from the first portion of the automated exam-building interface, wherein the user input comprises an explicit manual selection of the first chunk from the displayed text data;

generating a first task by combining the first chunk with a first request, wherein the first chunk was selected via a user input selecting the first chunk of the text data from the first portion of the user interface;

providing the first task to a large language model;

receiving from the large language model a first question and a first proposed answer based upon the first task;

displaying the first question and the first proposed answer within the second portion of the user interface; and generating a visual linkage between the selected first chunk in the first portion and the displayed first question in the second portion, wherein the visual linkage between the selected first chunk in the first portion and the displayed first question in the second portion comprises (i) highlighting the selected first chunk within the first portion of the user interface, and (ii) automatically scrolling the first portion of the user interface to the selected first chunk in response to a user selection of the displayed first question.

20. The computer-readable media of claim 19, the method further comprising:

identifying a second chunk of the text data, wherein the second chunk is identified by receiving a selection of a second chunk of the text data displayed on the first portion the user interface;

creating a second task by combining the second chunk with a second request;

generating, using the large language model, a second question and a second proposed answer based upon the second task; and displaying the second question and the second proposed answer within the second portion of the user interface.

* * * * *